C. B. CHANDLER.
LUBRICATING DEVICE FOR WHEELS.
APPLICATION FILED JAN. 13, 1908.
1,009,649.
Patented Nov. 21, 1911.
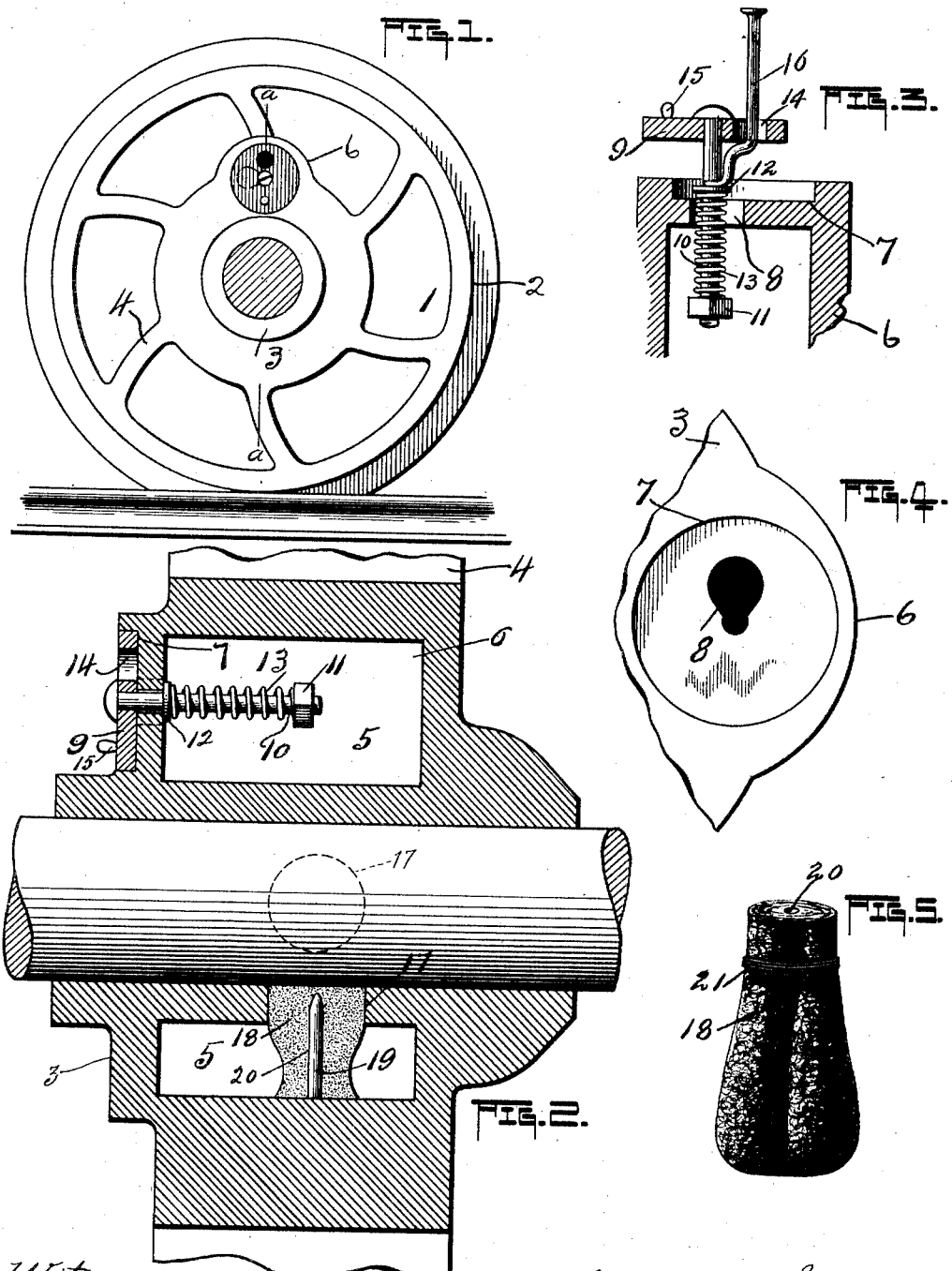

UNITED STATES PATENT OFFICE.

CARL B. CHANDLER, OF CANTON, ILLINOIS, ASSIGNOR, BY MESNE ASSIGNMENTS, TO CANTON FOUNDRY & HEATING CO., OF CANTON, ILLINOIS, A CORPORATION OF ILLINOIS.

LUBRICATING DEVICE FOR WHEELS.

1,009,649.      Specification of Letters Patent.      Patented Nov. 21, 1911.

Application filed January 13, 1908. Serial No. 410,583.

*To all whom it may concern:*

Be it known that I, CARL B. CHANDLER, a citizen of the United States, residing at Canton, in the county of Fulton and State of Illinois, have invented certain new and useful Improvements in Lubricating devices for Wheels; and I do hereby declare that the following is a full, clear, and exact description of the invention, which will enable others skilled in the art to which it appertains to make and use the same.

This invention has reference to certain new and useful improvements in wheels, and relates particularly to a new and improved valve mechanism forming a closure for the aperture in the hub through which the lubricant is poured into said hub; also, to a new and improved securing means for the packing or lubricant absorbing material through which the lubricant passes from the hub to the axle.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a front view, greatly reduced, of a wheel, with by improvements attached thereto; Fig. 2 is an enlarged vertical sectional view, as the same would appear if taken on the line *a—a* of Fig. 1; Fig. 3 is an enlarged detail sectional view of a portion of the hub having the lubricant chamber and showing one way of inserting into the hub the valve mechanism which controls the lubricant opening in said hub; Fig. 4 is an enlarged partial front elevation of the hub showing a plan of the valve-seat, and Fig. 5 is a perspective view of the packing or lubricant absorbing material carried in the hub of the wheel.

Like numerals of reference indicate corresponding parts throughout the figures.

1 denotes a preferred construction of wheel, provided with the usual tread 2, a hub 3 and spokes 4.

The hub is provided with an annular chamber 5, which is designed to contain a suitable lubricant, such as oil, which may be poured or otherwise inserted into said chamber, through an aperture or feed opening in the front wall of the hub 3. That portion of the chamber 5 into which the oil is poured is enlarged or swelled out as at 6, the front wall of which is provided with, preferably, an annular depression or valve-seat 7, which is provided with a feed-opening 8, having the shape preferably, of a key-hole, with the smaller end, central of said annular depression and the larger portion eccentric to said depression, as shown in the figures, preferably Fig. 4.

The valve mechanism for closing the feed opening 8, consists, preferably of a plate 9, of the diameter of the circular depression or valve seat 7, to which is attached and projecting centrally therefrom a stem 10 on the opposite end of which is carried a nut 11 or equivalent member; and between said nut and a washer 12, there is carried a coil spring 13, for a purpose to be explained.

The valve plate 9, is provided with a feed opening 14, which, when said plate is in operative position in the valve seat 7 of the hub may be brought to coincide with the larger end of the feed opening 8 in said valve seat, whereby a lubricant may be poured into the chamber 5 through the opening 14 in the plate 9 and the feed opening 8 in the hub. When said plate has been moved to a position where the opening 8 is closed by said plate 9, a closure has been made, which will absolutely shut off the escape or leakage of any of the lubricant contained in the chamber 5, except through openings from the chamber 5 to the axle, in a manner to be explained.

When the valve plate 9 is in its operative position in the valve-seat 7 of the hub, the stem 10 extends into the chamber 5 through the smaller end of the feed opening 8, while the spring 13 which exerts a pressure between the washer 12 and bolt 11, firmly holds the washer 12 against the inner face of the wall of the valve-seat 7, and under such influence, the valve plate 9 is firmly held in the depression or valve-seat 7, as shown in Fig. 2. To facilitate the rotating of the plate 9, whereby the opening 14 therein may be brought coincident with the feed opening 8 in the valve-seat 7, I have shown the plate 9 provided with a lug 15, which may be engaged by a suitable tool or the finger for rotating said plate, for the purposes explained.

To seat the valve plate 9, in operative position in the valve-seat 7, some suitable key such as I have shown as 16 in Fig. 3, must be provided, which is capable of being inserted through the opening 14 in the plate 9 and caused to engage the stem 10 to depress the coil spring 13, as shown in Fig. 3. When said spring has been so depressed, the stem is inserted down through the larger end of the feed openings 8, which is large enough to accommodate the spring 13 and washer 12, and as soon as the stem has been inserted far enough into the chamber 5 to allow for the release of the key 16, the stem 10 may be shoved into the smaller end of the key-hole opening 8, when the valve plate 9, will assume its normal position in the depression or valve-seat 7, as shown in Fig. 2, and held against longitudinal displacement by the spring 13.

It is understood that the valve mechanism when once placed, need not be disturbed, and that any suitable means for seating the valve may be employed, and that the means above explained, is illustrated that the application of the parts may be the better understood. The carrying of the spring 13 within the chamber 5, constantly in the lubricant, preserves the life of the spring and adds greatly to the perfect operation of the valve mechanism and the closing of the feed-opening in the hub.

The lubricant in the chamber 5 is fed therefrom to the axle or spindle through openings 17, suitably disposed in the inner wall of the chamber 5, and said openings 17 are filled with a suitable packing 18, such as hair-felt or some other absorbent material which is flush with the bore of the hub and projects into the chamber 5, and is immovably held by being impaled on a stake or stem 19 projecting from the outer wall of the chamber 5, across the chamber and into and partially through the openings 17, as shown in Fig. 2. In this way the packing is held in direct contact with the oil or other lubricant, while at the same time, it occupies a very small space in the chamber 5, and impaled on the stake or stem 19, it will be readily seen that such packing cannot become displaced by the motion of the wheel, or the oil or other lubricant in the chamber 5. I have shown in detail only one stake 19 and packing impaled on the same but it is of course understood there are a plurality of such stakes and packing such as indicated in dotted lines in Fig. 2.

In Fig. 2 the packing 18 is in one solid piece, formed with an opening 20 to allow for its being shoved onto the stake or stem 19, by being inserted through the opening 17 in the hub. In Fig. 5 the packing 18 is made from a strip of material and when rolled or caused to assume the desired shape, is held together by a wire-tie 21, as shown.

While I have shown and described the preferred construction of valve mechanism and the manner of inserting and locking the same in the hub of the wheel, it is to be understood that there is a wide range of modifications which might be very easily substituted and possibly prove quite as efficient, as the construction here shown, and I do not wish to be limited to the details of construction herein set forth.

Having thus fully described my invention what I claim and desire to secure by Letters Patent of the United States, is:—

1. The combination of a lubricant containing chamber, one wall thereof provided with an annular depression and having a key-hole shaped filling-opening, a plate fitting said depression to form a closure for said filling-opening and having an aperture capable of being moved to a position to coincide with a portion of said filling-opening, a stem connected centrally of said plate and operatively carried through said filling-opening, and means connected with said stem and inclosed within said chamber, for securing said plate in operative position in said depression.

2. The combination of a lubricant containing chamber, one wall thereof provided with a valve-seat and an elongated opening, one end of said opening being much larger than the other, an apertured valve-plate adapted to be seated in said valve-seat, a stem attached to said plate and a coil-spring on said stem, said stem and spring capable of being inserted through the larger end of the filling-opening, whereby said plate may be seated in said valve-seat, and when so seated, said spring capable of retaining said plate in operative position in said valve-seat.

3. The combination of a lubricant containing chamber, one wall thereof provided with an annular seat and a key-hole shaped opening leading from the center of said seat, a valve-plate having an aperture adapted to coincide with the outer portion of the opening in said valve-seat, a stem leading from the center of said plate and capable of being inserted into said chamber through said key-hole shaped opening, and upon the centering of said valve-plate assuming a position in the inner end of said key-hole shaped opening, and means on said stem for retaining said plate seated in said valve-seat.

4. The combination of a lubricant containing chamber, one wall thereof provided with a valve-seat and an opening radiating from the center of said seat to a suitable point from said center, the outer portion of said opening being larger than the inner portion thereof, a valve-plate adapted to be seated in said valve-seat to form a closure for the opening therein and having an aperture capable of being brought coincident with the outer portion of said opening in the valve-seat, a stem attached to said plate, a coil-spring on said stem, the stem and spring being adapted to be inserted through the larger portion of the opening in the valve-seat, and said plate seated in said valve-seat with the stem projecting into the chamber through the inner portion of said opening and said valve-plate be thereby yieldingly retained in said valve-seat.

5. A wheel hub having an annular lubricant containing chamber with lubricating-openings in the inner wall of said chamber, stakes projecting from the outer wall of said chamber and extending across the same axially of the lubricating-openings, and packing impaled on said stakes and projecting through said lubricating openings.

6. A wheel hub having an exterior lubricant containing chamber formed with a plurality of lubricating-openings opening into the bore of said hub, stakes extending across said chamber coincident with each of said openings with their free ends in said openings, and packing adapted to be inserted into said chamber through said openings and retained therein by being impaled on said stakes.

In testimony whereof I affix my signature, in presence of two witnesses.

CARL B. CHANDLER.

Witnesses:
CHAS. W. LA PORTE,
LAURA E. CLAYPOOL.

Copies of this patent may be obtained for five cents each, by addressing the "Commissioner of Patents, Washington, D. C."